United States Patent
Arnold et al.

[11] 3,812,658
[45] May 28, 1974

[54] GAS CLEANING APPARATUS
[75] Inventors: Orlan M. Arnold, Norwalk; Carlo A. Vancini, Stamford, both of Conn.
[73] Assignee: Peabody Engineering Corporation, New York, N.Y.
[22] Filed: May 14, 1973
[21] Appl. No.: 359,748

[52] U.S. Cl.............. 55/239, 55/248, 55/257, 261/79 A
[51] Int. Cl............................................. B01d 47/02
[58] Field of Search............... 55/95, 239, 244–256; 261/79 A, 119, 121

[56] References Cited
UNITED STATES PATENTS
3,517,485   6/1970   Dellagnese et al.................. 55/227
FOREIGN PATENTS OR APPLICATIONS
399,646   7/1924   Germany ............................ 55/237
719,650   4/1942   Germany ............................ 55/237
930,383   7/1963   Great Britain ...................... 55/239

Primary Examiner—Bernard Nozick
Attorney, Agent, or Firm—N. L. Leek; Robert H. Bachman

[57] ABSTRACT

Gas cleaning apparatus comprising a vessel having a moisture eliminator zone and a reservoir to receive the separated liquid. An inlet duct extends into the liquid in the reservoir peripherally of the vessel with a peripheral discharge opening disposed to cause the gases and liquid to rotate in the vessel. The foam is blown away from the opening by the force of the gas flow and is removed in a collecting zone. A separator plate in the liquid below the end of the duct assists in maintaining relatively clear liquid in the zone below the duct and in the path of the discharged gases.

6 Claims, 4 Drawing Figures

PATENTED MAY 28 1974 3,812,658
SHEET 1 OF 2

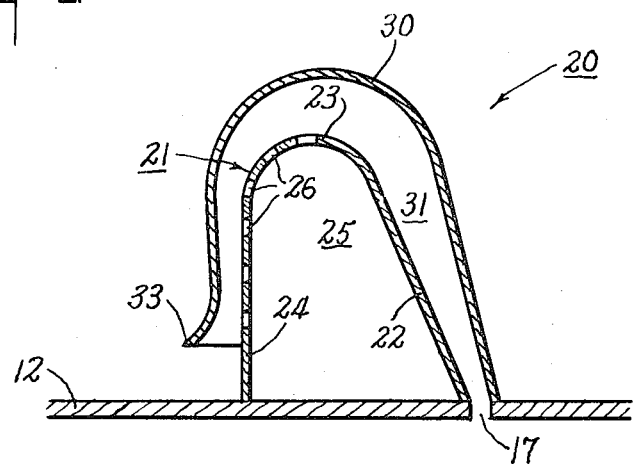
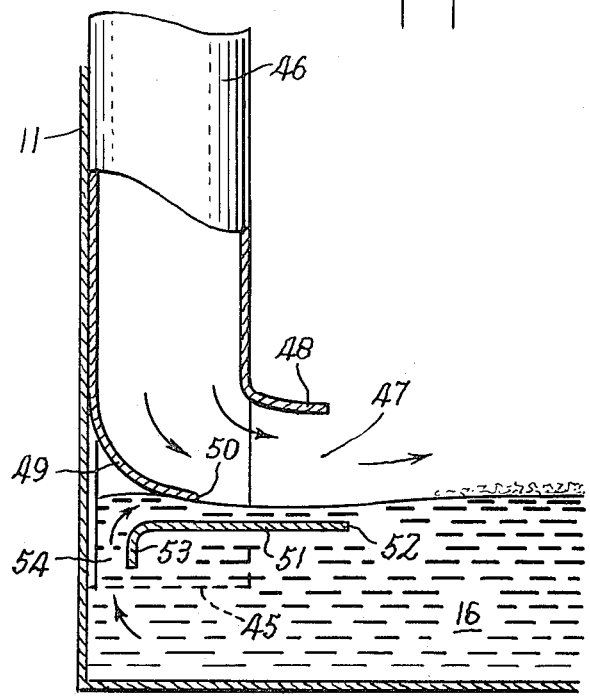

GAS CLEANING APPARATUS

This invention relates to apparatus for cleaning gases and, more particularly, to gas washing and drying equipment and has for an object to provide apparatus of the above type having novel and improved details of construction and features of operation.

Another object is to provide apparatus having improved means for collecting and removing entrained liquids and droplets in conjunction with a moisture eliminator stage.

Various other objects and advantages will be apparent as the nature of the invention is more fully disclosed.

In accordance with the present invention the apparatus includes a vessel having a transverse diaphragm dividing the vessel into an inlet zone and a drying zone and having a reservoir to receive the separated liquid. The inlet duct terminates in the liquid in the reservoir, and has means for producing a flow of the liquid so as to maintain a relatively clean liquid surface in contact with the incoming gases. Thus any mist which is picked up by the gases and which contacts the plates of the moisture eliminators will be relatively free from contaminants.

The nature of the invention will be better understood from the following description, taken in connection with the accompanying drawings in which specific embodiments have been set forth for purposes of illustration.

In the drawings:

FIG. 3 is a partial section taken on the line 3—3 of FIG. 1 showing the construction of the moisture eliminator; and FIG. 4 is a partial vertical section of a gas cleaning apparatus illustrating a further embodiment of the invention.

Figure 1:
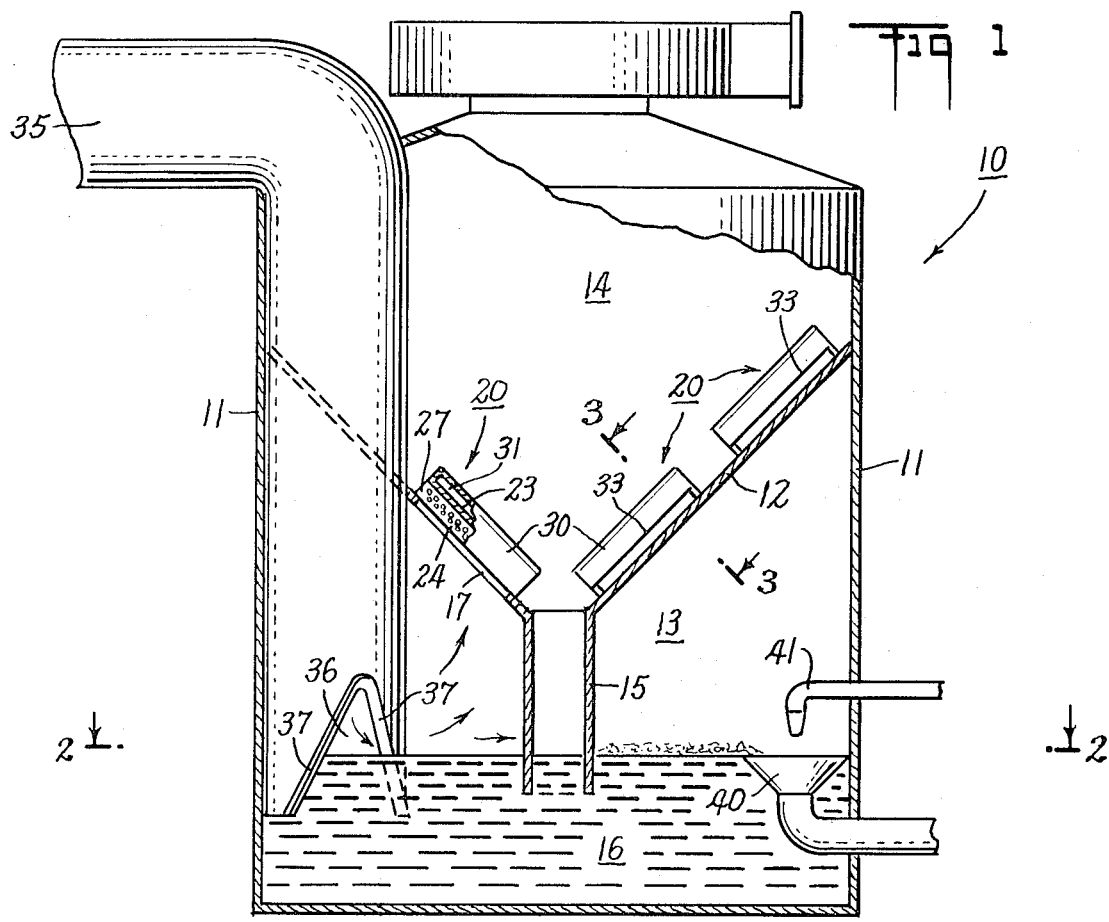
FIG. 1 is a vertical section through a gas cleaning apparatus embodying the invention.

Referring to the drawings more in detail, the apparatus is shown as comprising a vessel 10 having side walls 11 and having a transverse diaphragm 12 dividing the vessel into an inlet zone 13 and a gas drying zone 14. The diaphragm 12 is shown as coned downwardly with a central drain pipe 15 dipping into the liquid in a reservoir 16 beneath the vessel 10 and having a plurality of radial slots 17 through which the gases pass into the drying zone 14.

A moisture eliminator 20 is disposed in registration with each slot 17. These eliminators comprise a U-shaped inner plate 21 having an inner wall 22 contacting the adjacent edge of a slot 17, a curved top wall 23 and an outer wall 24 enclosing a chamber 25 for stripped gases. Gases are fed into this chamber 25 through openings 26 in the wall 24 and are discharged into the drying zone 14 from an opening 27, FIG. 1, at the upper inclined end of the chamber.

A second curved plate 30 is disposed around the U-shaped plate 21 with its inner edge engaging the edge of the slot 17 to form an arcuate passage 31 through which the gases pass with a reversal in direction. The outer edge 33 terminates above the diaphragm 12 for the escape of stripped gases into the drying zone 14. The removed liquid droplets drip from this plate 30 onto the diaphragm and through the central pipe 15 into the liquid in the reservoir 16. Slot 17 is narrower than passage 31 to form a venturi-like constriction for increasing the velocity of the gases and improving the separation. This type of moisture eliminator is shown more in detail in copending application Ser. No. 306,611, filed Nov. 15, 1972 and only as much thereof is disclosed herein as is necessary for an understanding of the invention.

Figure 2:
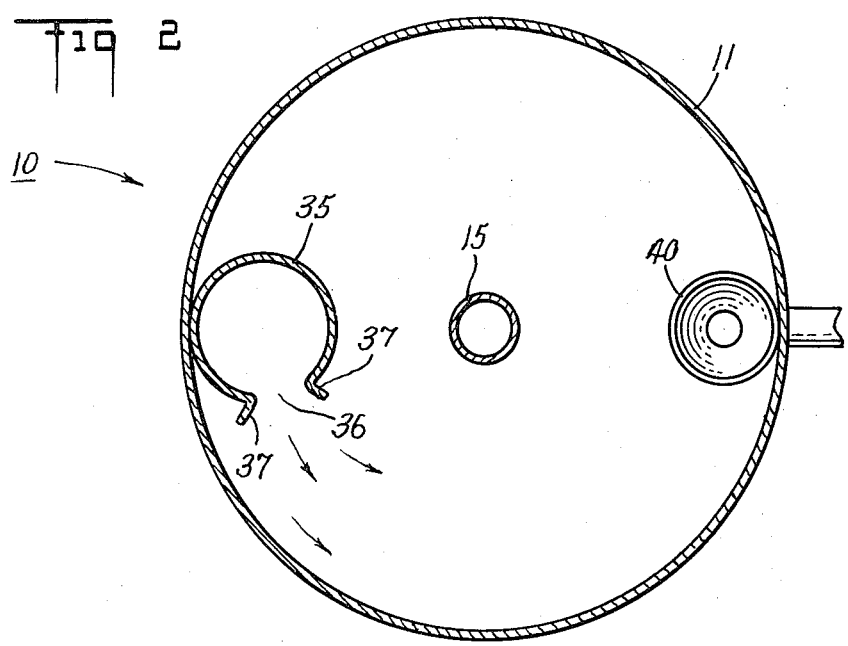
FIG. 2 is a horizontal section taken on the line 2—2 of FIG. 1 showing the arrangement of the parts.

In accordance with this invention, a gas inlet duct 35 extends downwardly along one side of the side wall 11 of the vessel 10 with its lower end terminating below the level of the liquid in the reservoir 16. A V-shaped discharge opening 36 is formed in one side of the duct 35 with its narrow end disposed above the liquid level so that a portion of the area of the opening is covered by the liquid. The sides 37 of the pipe from which the opening is cut are flared outwardly at an angle of some 45 degrees to form a venturi-like passage for the discharge of gases into the vessel 10 from the duct 35. The opening 36 is tangentially disposed, FIG. 2, with respect to the vessel 10 so that the gases and also the liquid in the reservoir are caused to rotate in the vessel for better distribution and more residence time.

In operation any foam which collects on the surface of the liquid in the reservoir, together with the upper strata of the liquid, is blown forwardly by the gases which are discharged through the opening 36 and is replaced by relatively clean liquid from the lower strata in the reservoir. Hence the major portion of the gas passes over this relatively clean liquid and any mist or moisture which is picked up thereby is relatively clean, and the moisture which is deposited on the plates of the moisture eliminators 20 contains a minimum of particulate material. The partially submerged inverted V-shaped opening 36 provides a self-compensating moisture pickup unit. The area of contact of the gases with the reservoir liquid surface is increased as the water level is lowered and the gas flow at all times causes a corresponding flow of liquid which is adapted to maintain a relatively clear liquid surface in contact with the gases. The moisture which is picked up by the gases is deposited on and maintains a liquid film on the passageway walls of the moisture eliminators 20, and this liquid film is continuously renewed.

The foam which collects on the opposite side of the vessel 10 is removed by a funnel 40 which is disposed in the liquid with its open end below the liquid level and into which the foam is forced by a jet of liquid 41. The funnel may discharge into a collector outside of the vessel 10. Such a foam remover is shown more in detail in copending application Ser. No. 216,184, filed Feb. 7, 1972.

In the embodiment of FIG. 4 the end 45 of the inlet duct 46 is provided with truncated V-shaped openings 47 as in FIG. 1. The flat upper edge of the opening 47 is bent outwardly to form an air nozzle 48 which provides a confined passage for gases between itself and the surface of the liquid. An inner curved plate 49 is disposed in the duct 46 with its edge 50 slightly above the liquid level to form an elbow for deflecting the gas stream transversely through the opening 47.

A flat separator plate 51 is disposed below the liquid level with its forward edge 52 in registration with the flange 48. The rearward edge 53 of plate 51 is flared downwardly and disposed below the edge 50 of the curved plate 49 and spaced therefrom to form a restricted passage 54 for the clear lower strata liquid to be surfaced above the plate 51 and in the path of the incoming gases in duct 46. This relationship of the flange 48, curved plate 49 and separator plate 51 form in effect an air-water pump for producing the desired circulation in the vessel.

The operation of this form is similar to that of the first form with the added feature that the incoming gases pass at high velocity through the venturi-like passage 47 to blow the foam forward while the clean liquid flows under the plate 51 and upwardly through the passage 54 into the area below the end of the duct 46. In this form the flow of liquid is maintained in the path of the gases discharged from the passage 47. The foam is collected and removed in the manner above described.

What is claimed is:

1. Gas cleaning apparatus comprising a vessel having a transverse diaphragm dividing the vessel into gas inlet and drying zones and having openings through which the gases pass into the drying zone, a liquid reservoir disposed beneath said vessel to collect separated liquids and moisture eliminators disposed in registration with each of said openings to remove entrained moisture and droplets and having means to discharge such removed liquids into said reservoir, and an inlet duct disposed peripherally of said vessel with an open end disposed below the level of the liquid in said reservoir, said duct having a discharge opening in its lower end directed peripherally of the said vessel with at least a portion of its area above the liquid level for the discharge of gases along the surface of said liquid whereby moisture is picked up from the liquid by the discharge of the gases to form liquid films on the surfaces of the moisture eliminators and a foam removing means disposed at a point remote from said opening, whereby the foam is blown from the vicinity of said opening and both the gases and the liquid are caused to rotate in said vessel by the peripherally discharged gases.

2. Apparatus as set forth in claim 1 in which a deflector plate is disposed in said duct to deflect the gases through said opening.

3. Apparatus as set forth in claim 1 in which said diaphragm is coned downwardly toward a center opening and said discharge means includes a drain pipe extending from said center opening into the liquid in said reservoir.

4. Apparatus as set forth in claim 1 in which a separator plate is disposed below the liquid level and extends at least partly below the end of said duct and under which the clear liquid flows into the area below said duct.

5. Apparatus as set forth in claim 4 in which the rearward edge of said plate is flared downwardly into the path of the liquid flow.

6. Apparatus as set forth in claim 5 in which a flange extends forwardly from above the opening in said duct to form with said plate a confined passage for the liquid and gases from said opening.

* * * * *